May 24, 1932. J. G. TOMPKINS 1,859,810
HOSE SUPPORTER
Filed July 10, 1930
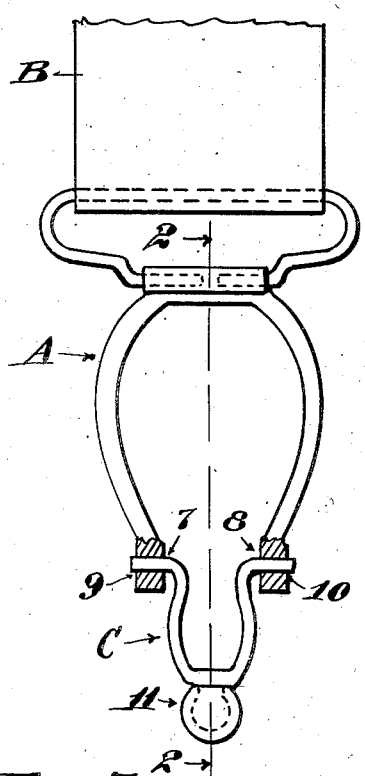
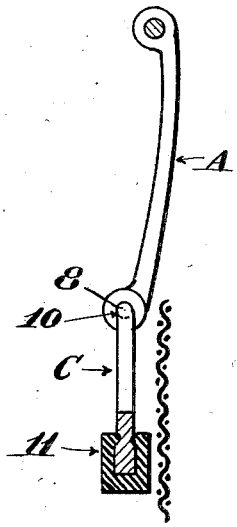
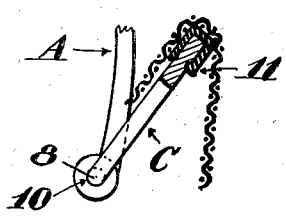
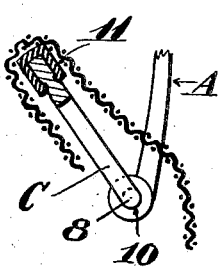
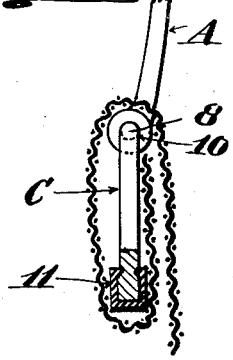
Inventor
James G. Tompkins
By R. S. Bury
Atty.

Patented May 24, 1932

1,859,810

UNITED STATES PATENT OFFICE

JAMES G. TOMPKINS, OF LOS ANGELES, CALIFORNIA

HOSE SUPPORTER

REISSUED

Application filed July 10, 1930. Serial No. 466,951.

This invention relates to a hose supporter and has as it's primary object the provision of a detachable connection between a hose and support which is adapted to be easily and quickly engaged with a hose and readily disengaged therefrom when desired, but which is so fashioned that when applied to a hose, accidental disengagement thereof will be practically obviated.

With the foregoing object in view, together with such other objects and advantages as may subsequently appear, the invention resides in the parts and in the combination, construction and arrangement of parts hereinafter described and claimed and illustrated by way of example in the accompanying drawings, in which:—

Fig. 1 is a front view of the hose support;

Fig. 2 is a detail in cross section taken on the line 2—2 of Fig. 1, illustrating the manner of initially positioning the hose engaging portion of the support preparatory to effecting connection of a fabric therewith;

Figs. 3, 4, and 5 are similar sectional views illustrating the mode of effecting connection between the support and the hose fabric.

Referring to the drawings more specifically, A indicates generally a yoke, the closed end of which is affixed to an elastic strip B or other suitable member of a garter, belt, or the like. The yoke A is rigid being preferably formed of metal, and pivotally connected to the outer end of the yoke A is a second yoke C which is formed with out-turned end portions 7 and 8 pivotally engaging opposed apertures 9 and 10 in the end portion of the yoke A. The yoke C is formed on its closed end with an extended knob 11, preferably formed with an elastic or resilient cushion, and is of such dimensions that it may be swung on its pivot connection through the yoke A. An important feature of the invention resides in mounting the yoke C so that it may be freely swung completely around its pivotal connection, and also in providing an unobstructed space leading from between the side members of the yoke C and the side members of its support A whereby a fabric may be wrapped around the connecting end portion of the yoke C by rotating the latter as hereinafter described. In the application and operation of the invention, the support is positioned with the yoke C depending therefrom as shown in Figs. 1 and 2 alongside the portion of the hose or fabric to be engaged thereby, as particularly shown in Fig. 2, whereupon the yoke C is swung upwardly as shown in Fig. 3 to position a portion of the fabric of the hose astride thereof. The yoke C is then advanced through the yoke A as shown in Fig. 4 and brought downwardly to its initial depending position as shown in Fig. 5, whereupon a portion of the fabric will be extended through the yoke C and will overlap a portion of the fabric engaged over the knob 11 thus effecting such engagement with the fabric that any pull on the latter away from the yoke C will more tightly effect connection between the fabric and the yoke. When it is desired to detach the fabric from the yoke C the latter is swung upwardly in the direction opposite that initially employed in effecting connection with the fabric and on the yoke then being swung to the opposite side of the yoke C a slight pull on the fabric will effect release thereof.

I claim:

1. In a hose supporter, a hose engaging yoke, and a support on which the ends of said yoke are pivoted to permit swinging movement of said yoke completely around an axis; said yoke being unobstructed at its open end and adapted to be directly engaged with a hose to be supported and to effect wrapping of the hose thereon on rotating said yoke on its support.

2. In a hose supporter, a pair of pivotally interconnected yokes, and a knob carried on one of the said yokes projecting from the closed end thereof, said last named yoke being operable to swing through the other yoke to effect complete rotation thereof, and said yokes being formed with an open space leading therebetween.

3. In a hose supporter, a supporting yoke having aligned apertures in the end portions thereof, a second yoke having out-turned end portions pivotally engaging said apertures, said last named yoke being formed to swing through said first named yoke, and means on said last named yoke astride of which a fabric may be imposed.

JAMES G. TOMPKINS.